(12) United States Patent
Miller

(10) Patent No.: US 6,782,440 B2
(45) Date of Patent: Aug. 24, 2004

(54) RESOURCE LOCKING AND THREAD SYNCHRONIZATION IN A MULTIPROCESSOR ENVIRONMENT

(75) Inventor: Chris D. Miller, Austin, TX (US)

(73) Assignee: T.N.S. Holdings, Inc., Austin, TX (US)

( * ) Notice: Subject to any disclaimer, the term of this patent is extended or adjusted under 35 U.S.C. 154(b) by 413 days.

(21) Appl. No.: 09/912,870

(22) Filed: Jul. 25, 2001

(65) Prior Publication Data

US 2002/0016879 A1 Feb. 7, 2002

Related U.S. Application Data

(60) Provisional application No. 60/220,974, filed on Jul. 26, 2000, and provisional application No. 60/220,748, filed on Jul. 26, 2000.

(51) Int. Cl.[7] .......................... G06F 12/00; G06F 13/16; G06F 12/14
(52) U.S. Cl. ...................... 710/200; 710/108; 709/104; 711/147; 707/8
(58) Field of Search .......................... 710/200, 36, 108, 710/52, 240; 709/100, 104; 707/8; 711/147, 148, 152, 163

(56) References Cited

U.S. PATENT DOCUMENTS

| | | | | |
|---|---|---|---|---|
| 4,486,834 A | | 12/1984 | Kobayashi et al. .......... | 364/200 |
| 4,574,350 A | * | 3/1986 | Starr .......................... | 710/200 |
| 5,341,491 A | * | 8/1994 | Ramanujan ................. | 711/152 |
| 5,568,609 A | | 10/1996 | Sugiyama et al. ..... | 395/183.19 |
| 5,586,331 A | * | 12/1996 | Levenstein .................. | 710/200 |
| 5,604,882 A | | 2/1997 | Hoover et al. | |
| 5,668,943 A | | 9/1997 | Attanasio et al. | |
| 5,729,749 A | * | 3/1998 | Ito .............................. | 710/200 |
| 5,765,157 A | | 6/1998 | Lindholm et al. | |
| 5,991,845 A | * | 11/1999 | Bohannon et al. .......... | 710/200 |
| 6,343,338 B1 | * | 1/2002 | Reneris ...................... | 710/200 |
| 6,427,195 B1 | | 7/2002 | McGowen et al. | |
| 6,449,614 B1 | * | 9/2002 | Marcotte ....................... | 707/8 |

FOREIGN PATENT DOCUMENTS

EP       0 602 791 A2    6/1994    ........... G06F/15/16

OTHER PUBLICATIONS

International Search Report for PCT/US02/23171 mailed Mar. 3, 2003.
International Search Report dated Jul. 16, 2002.
International Search Report dated Jun. 5, 2002.
Bershad, et al., "The Midway Distributed Shared Memory System" Compcon Digest of Papers, pp. 528–537, Feb. 22, 1993.

(List continued on next page.)

*Primary Examiner*—Gopal C. Ray
(74) *Attorney, Agent, or Firm*—Gray Cary Ware & Freidenrich LLP

(57) ABSTRACT

Systems and methods are described for resource locking and thread synchronization in a multiprocessor environment. One method includes restricting access to a protected shared resource by use of a lock; issuing the lock to a requesting software to permit access to the protected shared resource; indicating the issuance of the lock to the requesting software by writing a first value to a lock register; freeing the lock, thereby making the lock available for use by another requesting software, after the requesting software completes accessing the protected shared resource; and indicating that the lock is free by writing a second value to the lock register.

7 Claims, 2 Drawing Sheets

OTHER PUBLICATIONS

Wilson, et al. "Hardware Assist for Distributed Shared Memory" Proceedings of the International Conference on Distributed Computing Systems, pp. 246–255, May 25, 1993.

Songnian, et al. "Heterogeneous Distributed Shared Memory," IEEE Transactions on Parallel and Distributed Systems, vol. 3, No. 5, pp. 540–554, Sep. 1, 1992.

Nitzberg, et al. "Distributed Shared Memory: A Survey of Issues and Algorithms," IEEE Computer Society, pp. 52–60, Aug. 1, 1991.

Stumm, et al., "Algorithms Implementing Distributed Shared Memory," IEEE Computer Society, pp. 54–64, May 1, 1990.

Ananthanarayanan, et al. "Experiences in Integrating Distribubted Shared Memory with Virtual Memory Management," Operating Systems Review, vol. 26, No. 3, pp. 4–26, Jul. 1, 1992.

Bisiani, et al., "PLUS: A Distrubuted Shared–Memory System," Proceedings of the Annual International Symposium on Computer Architecture, pp. 115–124, May 28, 1990.

Levelt, "A Comparison of Two Paradigms for Distributed Shared Memory," Software Practice & Experience, vol. 22, No. 11, pp. 985–1010, Nov. 1, 1992.

Ramachandran, et al. "Programming with Distributed Shared Memory," Proceedings of the Annual International Computer Software and Applications Conference, vol. Conf. 13 pp. 176–183, Sep. 20, 1989.

* cited by examiner

RESOURCE LOCKING AND THREAD SYNCHRONIZATION IN A MULTIPROCESSOR ENVIRONMENT

CROSS-REFERENCES TO RELATED APPLICATIONS

This application is a continuation-in-part of, and claims a benefit of priority under 35 U.S.C. 119(e) and/or 35 U.S.C. 120 from, copending U.S. Ser. No. 60/220,974, filed Jul. 26, 2000, and 60/220,748, also filed Jul. 26, 2000, the entire contents of both of which are hereby expressly incorporated by reference for all purposes.

BACKGROUND OF THE INVENTION

1. Field of the Invention

The invention relates generally to the field of computer systems. More particularly, the invention relates to computer systems containing a multiplicity of cooperating CPUs with resources shared between the CPUs wherein one or more CPU may attempt to access shared resources simultaneously, thereby leading to possible contention between CPUs.

2. Discussion of the Related Art

Computer systems containing a plurality of CPUs have, of necessity, included methods for synchronizing accesses to resources shared between two or more of the CPUs. These synchronizing methods are used to ensure that any such shared resources are always left in a coherent state after any CPU is finished utilizing them. In many cases, there may be multiple levels of synchronizing methods; e.g. a simple method such as a spinlock can insure that only one CPU inside an SMP is accessing a more elaborate method, such as a mutex, at any one time. These synchronizing methods can be very costly in terms of CPU cycles, thus potentially reducing overall system performance.

As an example, consider the case of a spinlock. When using a spinlock, a thread of execution must first make itself non-interruptible; this is a non-trivial operation on many modern operating systems. Once the thread is non-interruptible, it can attempt to acquire the spinlock, which will take an indeterminate amount of time depending on how many other CPUs are simultaneously requesting the spinlock. During this acquisition period, no other processing can occur on any of the CPUs waiting for the spinlock to become available. Once a CPU has acquired the spinlock, it can access the resource the spinlock is protecting, then release the spinlock and exit the non-interruptible code segment. The other CPUs continue to wait on the spinlock until it becomes available. Each, in turn, repeats the resource consumptive cycle of wait, acquire, access, and release.

A potentially more efficient use of spinlocks in a multiple CPU environment is obvious to one skilled in the art. The requesting thread can determine, after a certain number of attempts, that spinlock is in use and is likely to be in use for an indeterminate period. The thread can then use a local operating system synchronizing method, such as a timer-driven semaphore, to wake and periodically retry the acquisition of the spinlock. This allows other threads to run on the CPU during the wait period. The disadvantage this introduces is that the likelihood of a timely acquisition of the spinlock is reduced, and the latency until acquisition is greatly increased, depending on the granularity of the wait mechanism.

Some computer systems containing a multiplicity of cooperating CPUs have dedicated hardware designed purposely to aid in the cooperation of the CPUs. This dedicated hardware takes many forms, such as RAM accessible from multiple CPUs, unique hardware to perform common functions applicable to multiple CPUs, and other unique hardware to aid in synchronizing multiple CPUs. Any or all of these hardware functions could appear in a given design, and the implementation could be performed in any combination of fixed function devices such as ASICs, programmable devices such as FPGAs, or even one or more additional CPUs. Hardware such as this, which is accessible from more than one CPU, will be referred to as a shared resource.

Each CPU will have one or more methods for accessing these shared resources. In many systems, even though the CPUs may have instructions designed to help manage shared resources, the access to the shared resource will ultimately be achieved by the execution by the CPU of a memory or I/O access instruction. This memory or I/O access instruction will typically be directed at a device or set of devices which are designed to connect to, and accept memory or I/O instructions from, a multiplicity of CPUs. This device, or set of devices, may connect to the CPUs through one or more communication channels. These communication channels consist of the data and/or control signals and supporting devices that eventually connect a given CPU to the shared resources. Each of these communication channels may support a plurality of CPUs.

A problem with this technology has been contention between CPUs for access to a shared resource. This problem can be alleviated through methods that may be obvious to one skilled in the art, however, a simple solution to the problem of contention between CPUs gives rise to a second problem of increased latency.

In a computing system containing a multiplicity of CPUs, there is a requirement to provide a mutual exclusion mechanism for regulating access of shared resources spanning the CPUs. Additionally, each CPU has its own Operating System thread synchronization methods and requirements for management of system-local resources. What is needed is a solution that combines these two requirements in a low-latency design with minimum overhead expense.

SUMMARY OF THE INVENTION

There is a need for the following embodiments. Of course, the invention is not limited to these embodiments.

According to a first aspect of the invention, a method comprises: restricting access to a protected shared resource by use of a lock; issuing the lock to a requesting software to permit access to the protected shared resource; indicating the issuance of the lock to the requesting software by writing a first value to a lock register; freeing the lock, thereby making the lock available for use by another requesting software, after the requesting software completes accessing the protected shared resource; and indicating that the lock is free by writing a second value to the lock register. According to another aspect of the invention, a method, comprises: receiving a request from a requesting software to access a protected shared resource, the protected shared resource currently being accessed by another requesting software; designating a proxy value to represent the requesting software; adding the proxy value to a queue of proxy values contained in a lock register; suspending execution of the requesting software; determining when the protected shared resource is no longer being accessed by the another requesting software; if the proxy value representing the requesting software is first in the queue of proxy values, resuming execution of the requesting software using the proxy value;

if the proxy value representing the requesting software is first in the queue of proxy values, allowing the requesting software to access the protected shared resource using the proxy value; if the proxy value representing the requesting software is first in the queue of proxy values, upon completion of access to the protected shared resource by the requesting software, removing the proxy value representing the requesting software from the queue of proxy values; and if there is no next proxy value in the queue of proxy values, writing a release value to the lock register. According to another aspect of the invention, a method comprises: receiving a request from a requesting software to access a protected shared resource, the protected shared resource not being used by another requesting software; acquiring a lock from a lock register to permit the requesting software to access the protected shared resource; accessing the protected shared resource; and upon completion of access to the protected shared resource by the requesting software, writing a release value to the lock register. According to another aspect of the invention, an apparatus comprises: a shared resource logic control including a lock and a lock register containing a queue of proxy values; a first requesting central processing unit coupled to the shared resource logic control; a second requesting central processing unit coupled to the shared resource logic control; and a protected shared resource, coupled to the shared resource logic control.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The below-referenced U.S. Patent Applications disclose embodiments that were satisfactory for the purposes for which they are intended. The entire contents of U.S. Ser. Nos. 09/273,430, filed Mar. 19, 1999; 09/859,193, filed May 15, 2001; 09/854,351, filed May 10, 2001; 09/672,909, filed Sep. 28, 2000; 09/653,189, filed Aug. 31, 2000; 09/652,815, filed Aug. 31, 2000; 09/653,183, filed Aug. 31, 2000; 09/653,425, filed Aug. 31, 2000; 09/653,421, filed Aug. 31, 2000; 09/653,557, filed Aug. 31, 2000; 09/653,475, filed Aug. 31, 2000; 09/653,429, filed Aug. 31, 2000; 09/653,502, filed Aug. 31, 2000; Ser. No 09/912,954, filed Jul. 25, 2001; Ser. No. 09/912,834, filed Jul. 25, 2001; Ser. No. 09/912,873, filed Jul. 25, 2001; Ser. No. 09/915,109, filed Jul. 25, 2001; Ser. No. 09/912,856, filed Jul. 25, 2001; Ser. No. 09/915,002, filed Jul. 25, 2001 Ser. No 09/912,870; filed Jul. 25, 2001; Ser. No 09/912,898, filed Jul. 25, 2001; and Ser. No. 09/912,833, filed Jul. 25, 2001 are hereby expressly incorporated by reference herein for all purposes.

The context of the invention can include a multiple CPU shared resource environment wherein one or more CPUs can access shared resources as they are needed.

In an embodiment of the invention, the shared resource exposes multiple lock registers to each CPU in an I/O or Memory space. These lock registers are monitored by shared resource control logic so that it may act upon write information as described herein. The shared resource also exposes status registers to each CPU and a mechanism to signal it, such as an interrupt.

For this description, a single lock is described. The implementation, however, is not limited to a single lock; a preferred implementation is to expose a multiplicity of locks.

Figure 1:
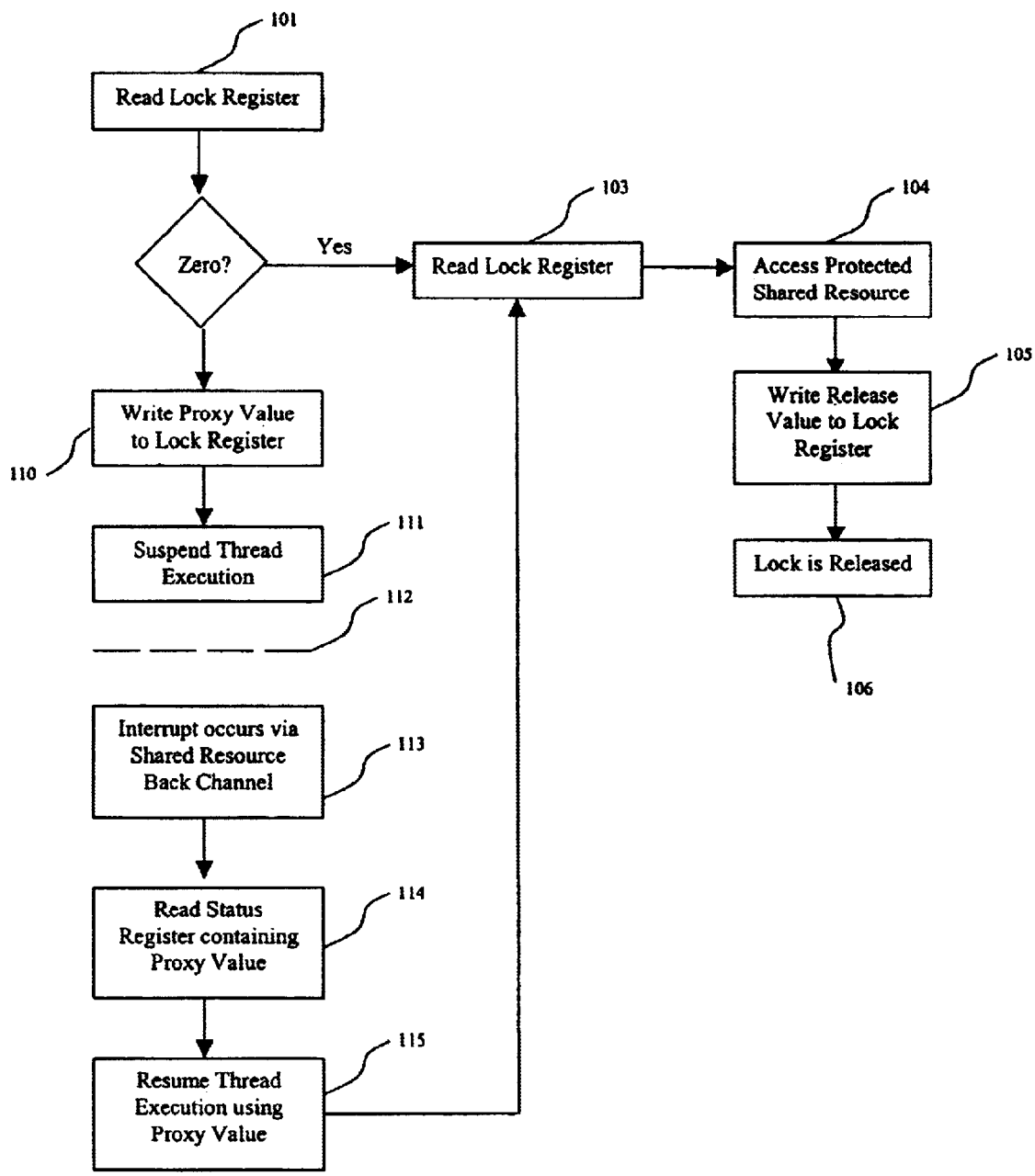
FIG. 1 illustrates a flow diagram of a process that can be implemented by a computer program, representing an embodiment of the invention.

Referring to FIG. 1, a flow diagram showing the use of a spinlock with proxy semaphore is shown. The decision flow is started when a CPU in a multiprocessor system issues a request to access protected shared system resources. A shared resource logic control accepts the requests and carries out subsequent request processing. Once a request is received from a CPU, a lock register 101 is read to determine whether or not a spinlock is free to be issued to the requesting CPU. The lock register reads zero if the lock is free. If the lock is being used, the lock register reads a value other than zero. If the lock register is free, the requesting CPU acquires the lock 103. The requesting CPU can then access protected shared resources 104, and after using the lock, the CPU writes a release value into the lock register 105 to release the lock 106 so it can be used by other requesting CPUs. If the lock is being used, the requesting CPU writes a proxy value to the lock register 110, to enter a proxy queue which is handled by the shared resource logic control. A thread requesting the protected resource is then suspended 111 until the proxy is returned to the CPU via a shared resource back channel 112 (the dashed line 113 indicates the presence of a time delay during which the thread remains suspended while the CPU is free to execute other threads). The proxy value is then read through a status register 114, following which thread execution is resumed using the proxy value 115, via which the lock can be acquired 103. The requesting CPU is then granted access to the protected shared resource 104. After accessing the protected shared resource, the CPU writes a release value to the lock register 105, following which the lock is released 106.

A single read operation of the lock manually acquires the lock. If the lock is free, it is considered acquired and the register returns a defined value (zero); the requesting thread can immediately access the protected shared resource. When access is complete (as determined by the thread), it then releases the spinlock by writing a defined value to a lock register (zero).

If the lock is not acquired, then it is currently held by a different thread or CPU, and a different defined value (non-zero) is returned. The thread can then write a non-zero value, such as an address of an Operating System Semaphore, to lock the register. This proxy value will be returned to the CPU when the lock is released, so that the thread can, in a preferred implementation, suspend and wake on it.

The proxy value, when written, is queued by the shared resource logic control, in FIFO order, behind the lock register. When the lock is released by the owning thread, the shared resource control logic does not release the lock to the interface logic (i.e., it disallows the "acquired" status for this lock). It instead delivers the proxy value at the top of the FIFO stack to the requesting CPU via the status registers and triggers the signaling mechanism. This results in the lock being delivered in a locked state to the requesting CPU. The requesting CPU can then use the proxy value to wake the suspended thread.

When, in an embodiment of the invention, the requesting thread is wakened, it can immediately access the protected shared resource, as it is now considered the owner of the lock. When access is complete (as determined by the thread), it then releases the spinlock by writing a defined value to the lock register (zero).

If there are further proxy values queued behind the lock, they are, in turn, delivered, signaled, etc., until the lock becomes free and quiescent.

If the lock is not currently held, a write to the lock register will cause the lock to be acquired and the proxy value to be delivered as if the lock had been held and then released.

If a CPU wishes to cancel the acquisition of a lock and delivery of its queued proxy value, a preferred implementation would provide a separate register that, when written to, causes the shared resource to cancel same. The register, when read, would return a defined value (zero) is the cancel operation was successful, or another value (non-zero) if it was not. In a preferred implementation, the shared resource exposes multiple lock cancel registers.

Figure 2:
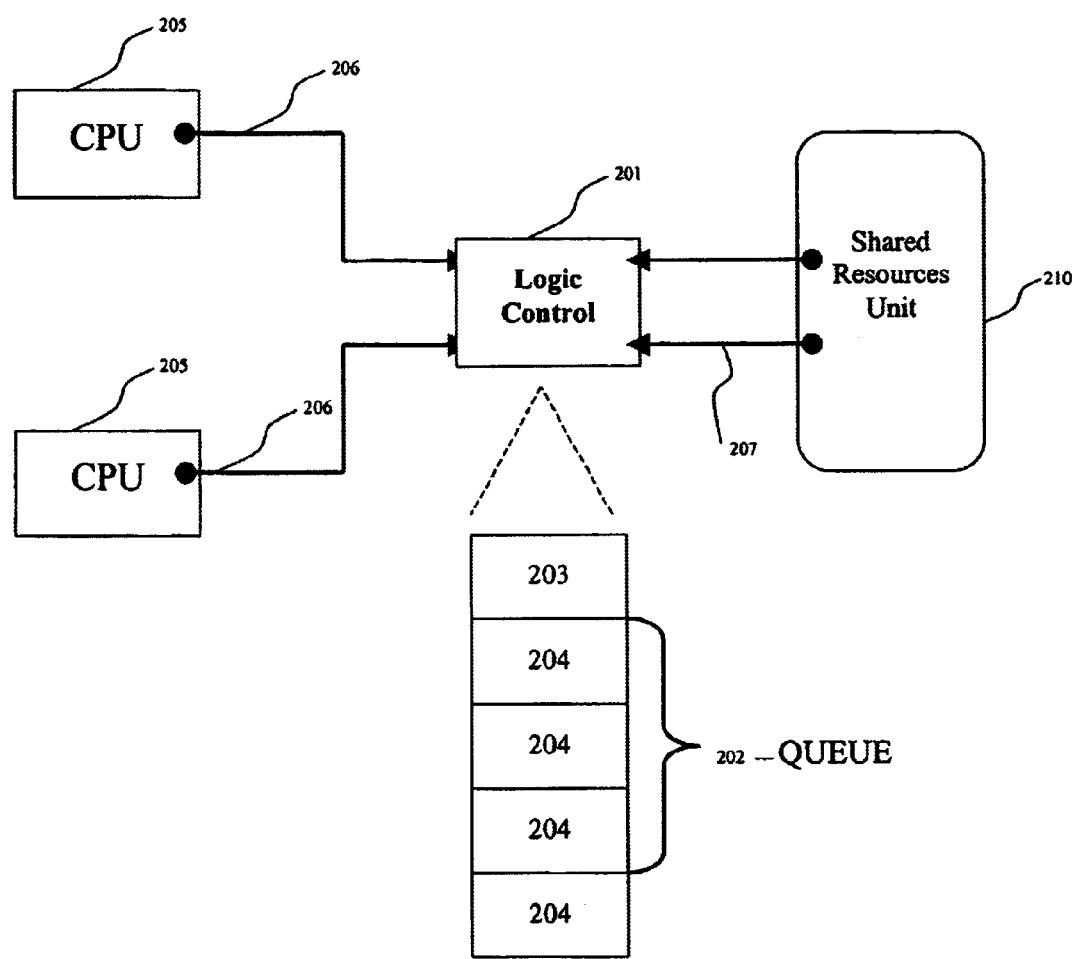
FIG. 2 illustrates a schematic representation of a multiple CPU environment featuring shared resource allocation control, representing another embodiment of the invention.

Referring to FIG. 2, a block diagram showing proxy control of spinlock based shared resource access is shown. Requesting CPUs 205 can be coupled to a shared resource logic control 201 via multiple CPU interconnects 206. The shared resource logic control 201 may be coupled to a shared resource unit 210 via multiple shared unit interconnects 207.

When a requesting CPU 205 is executing a thread that needs to access some protected resource in the shared resource unit 210, it sends a request to acquire a spinlock to the shared resource logic control 201. Upon receiving the request for the spinlock, the shared resource logic control 201 executes a series of logical operations to decide whether the spinlock is free for the requesting CPU 205 to use by reading a lock register 203. If the spinlock is free to access, the lock register 203 reads zero, and the shared resource logic control 201 instructs the requesting CPU 205 to acquire the spinlock by writing a proxy value into the lock register 203. If the spinlock is in use, the lock register 203 reads the proxy value written to it by the CPU using the spinlock. The requesting CPU 205 then sends its proxy value to the shared resource logic control 201, which enqueues this proxy behind the lock register 203 in a "first-in, first-out" (FIFO) order 202, along with proxies sent by all other CPUs requesting the spinlock. Once the spinlock is free, instead of writing a zero into the lock register 203, the shared resource logic control 201 acknowledges subsequent requests for the spinlock by writing the next proxy value (of the next requesting CPU 205) into the lock register 203. Once all requests for a spinlock have been satisfied, the shared resource logic control 201 instructs the last requesting CPU to write a zero in the lock register 203, thus indicating that it is free for subsequent requests, and that there is no queue to acquire the spinlock.

In another embodiment of the invention, a management thread within the CPU aggregation will periodically scan the shared resource for abandoned locks, dead threads that are holding locks, etc., to ensure the locking and its queuing mechanism remains viable.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

While not being limited to any particular performance indicator or diagnostic identifier, preferred embodiments of the invention can be identified one at a time by testing for the absence of contention between CPUs and system latency. The test for the absence of contention between CPUs and system latency can be carried out without undue experimentation by the use of a simple and conventional resource usage monitoring experiment.

PRACTICAL APPLICATIONS OF THE INVENTION

A practical application of the invention that has value within the technological arts is in multiple CPU shared resource environments. Further, the invention is useful in conjunction with shared memory units (such as are used for the purpose of network databases), or the like. There are virtually innumerable uses for the invention, all of which need not be detailed here.

ADVANTAGES OF THE INVENTION

A method for resource locking and thread synchronization in a multiple CPU environment, representing an embodiment of the invention, can be cost effective and advantageous for at least the following reasons. The invention improves quality and/or reduces costs compared to previous approaches. The principle advantages of this invention are a low latency on uncontested lock acquisition, and a low overhead, minimum latency on acquisition failure. The mechanism requires no access hierarchy, and so is inherently atomic.

All the disclosed embodiments of the invention disclosed herein can be made and used without undue experimentation in light of the disclosure. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, variation may be made in the steps or in the sequence of steps composing methods described herein.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   receiving a request from a requesting software to access a protected shared resource,
   the protected shared resource currently being accessed by another requesting software;
   designating a proxy value to represent the requesting software;
   adding the proxy value to a queue of proxy values contained in a lock register;
   suspending execution of the requesting software;
   determining when the protected shared resource is no longer being accessed by another requesting software;
   if the proxy value representing the requesting software is first in the queue of proxy values, resuming execution of the requesting software using the proxy value;
   if the proxy value representing the requesting software is first in the queue of proxy values, allowing the requesting software to access the protected shared resource using the proxy value;
   if the proxy value representing the requesting software is first in the queue of proxy values, upon completion of access to the protected shared resource by the requesting software, removing the proxy value representing the requesting software from the queue of proxy values; and
   if there is no next proxy value in the queue of proxy values, writing a release value to the lock register.

2. The method of claim 1, wherein the protected shared resource can only be accessed by one requesting software at a time.

3. The method of claim 1, wherein the queue of proxy values in the lock register is maintained in a chronological order.

4. The method of claim 1, wherein access to the protected shared resource is allowed by the acquisition of a spinlock.

5. The method of claim 1, wherein the requesting software is executed on a requesting central processing unit.

6. The method of claim 5, wherein the requesting central processing unit is free to execute other software while the requesting software is suspended.

7. The method of claim 1, wherein writing a release value to the lock register enables other requesting software to access the protected shared resource without the use of the proxy value.

* * * * *